US009281612B2

(12) United States Patent
Gao et al.

(10) Patent No.: US 9,281,612 B2
(45) Date of Patent: Mar. 8, 2016

(54) MAGNETIC CONNECTOR HAVING A UNITARY HOUSING

(71) Applicant: Apple Inc., Cupertino, CA (US)

(72) Inventors: Zheng Gao, San Jose, CA (US); John C. DiFonzo, Emerald Hills, CA (US); Joshua Banko, Cupertino, CA (US); Min Chul Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 14/029,705

(22) Filed: Sep. 17, 2013

(65) Prior Publication Data

US 2014/0179126 A1      Jun. 26, 2014

Related U.S. Application Data

(63) Continuation of application No. 12/582,308, filed on Oct. 20, 2009, now Pat. No. 8,535,088.

(51) Int. Cl.
*H01R 13/58* (2006.01)
*H01R 9/03* (2006.01)
*H01R 13/62* (2006.01)
*H01R 13/24* (2006.01)
*H01R 13/717* (2006.01)

(52) U.S. Cl.
CPC .............. *H01R 13/5845* (2013.01); *H01R 9/03* (2013.01); *H01R 13/6205* (2013.01); *H01R 13/24* (2013.01); *H01R 13/5816* (2013.01); *H01R 13/7175* (2013.01); *H01R 2201/06* (2013.01)

(58) Field of Classification Search
CPC ............... H01R 2201/12; H01R 13/17; H01R 13/2421; H01R 13/502
See application file for complete search history.

(56) References Cited

U.S. PATENT DOCUMENTS

| 2,170,287 | A | 8/1939 | Kinnebrew |
| 2,234,982 | A | 3/1941 | Ross |
| 3,144,527 | A | 8/1964 | Tolegian |
| 3,363,214 | A | 1/1968 | Wright |
| 3,431,428 | A | 3/1969 | Valer |
| 3,521,216 | A | 7/1970 | Tolegian |
| 3,713,370 | A | 1/1973 | Prijn |
| 3,786,391 | A | 1/1974 | Mathauser |

(Continued)

FOREIGN PATENT DOCUMENTS

| CA | 2 122 915 | 3/1994 |
| CN | 2932743 Y | 8/2007 |

(Continued)

OTHER PUBLICATIONS

English Abstract of JP2002056929 to Zojirushi Corp, obtained from http://esp@cenet.com, 1-pg.

(Continued)

*Primary Examiner* — Truc Nguyen
(74) *Attorney, Agent, or Firm* — Kilpatrick Townsend & Stockton LLP

(57) ABSTRACT

Power cables that include plug housings having an improved appearance as well as employ a halogen-free cable while providing adequate fire resistance. One example provides a power cable having cable plug with a substantially unitary body. Another example provides a power cable that is formed using halogen-free materials. To provide adequate fire protection, a strain relief formed using multiple materials is used.

21 Claims, 6 Drawing Sheets

(56) References Cited

U.S. PATENT DOCUMENTS

| | | | |
|---|---|---|---|
| 3,808,577 A | 4/1974 | Mathauser | |
| 3,810,258 A | 5/1974 | Mathauser | |
| 3,868,160 A | 2/1975 | Kersman | |
| 4,211,456 A | 7/1980 | Sears | |
| 4,317,969 A | 3/1982 | Riegler et al. | |
| 4,669,791 A | 6/1987 | Savill | |
| 4,810,202 A | 3/1989 | Nodfelt | |
| 4,844,582 A | 7/1989 | Giannini | |
| 5,382,167 A | 1/1995 | Janson, Jr. | |
| 5,385,476 A | 1/1995 | Jasper | |
| 5,556,284 A | 9/1996 | Itou et al. | |
| 5,696,861 A | 12/1997 | Schimmeyer | |
| 5,812,356 A | 9/1998 | O'Connor | |
| 5,829,987 A | 11/1998 | Fritsch et al. | |
| 5,921,783 A | 7/1999 | Fritsch et al. | |
| 5,941,729 A | 8/1999 | Sri-Jayantha | |
| 5,954,520 A | 9/1999 | Schmidt | |
| 6,007,363 A | 12/1999 | Renk | |
| 6,030,229 A | 2/2000 | Tsutsui | |
| 6,042,385 A | 3/2000 | Watanabe et al. | |
| 6,088,752 A | 7/2000 | Ahern | |
| 6,183,264 B1 | 2/2001 | Harsanyi | |
| 6,211,581 B1 | 4/2001 | Farrant | |
| 6,217,339 B1 | 4/2001 | Tsubata | |
| 6,219,267 B1 | 4/2001 | Andres | |
| 6,250,931 B1 | 6/2001 | Mendelson | |
| 6,267,602 B1 | 7/2001 | Mendelson et al. | |
| 6,340,302 B1 | 1/2002 | Ladd | |
| 6,464,509 B1 | 10/2002 | Emberty et al. | |
| 6,466,718 B1 | 10/2002 | Linnell | |
| 6,478,614 B1 | 11/2002 | De'Longhi | |
| 6,527,570 B1 | 3/2003 | Hartman et al. | |
| 6,528,746 B2 | 3/2003 | DeWitt et al. | |
| 6,545,577 B2 | 4/2003 | Yap | |
| 6,561,815 B1 | 5/2003 | Schmidt | |
| 6,565,363 B2 | 5/2003 | Downing | |
| 6,595,801 B1 | 7/2003 | Leonard et al. | |
| 6,607,391 B2 | 8/2003 | Mendelson et al. | |
| 6,616,468 B2 | 9/2003 | Sakiyama | |
| 6,623,276 B2 | 9/2003 | Dalmau Ferrerfabrega | |
| 6,727,477 B1 | 4/2004 | Li-Chen | |
| 6,743,025 B2 | 6/2004 | Howard | |
| 6,821,126 B2 | 11/2004 | Neidlein | |
| 6,966,781 B1 | 11/2005 | Bullinger et al. | |
| 6,976,882 B2 | 12/2005 | Kernan | |
| 6,988,897 B2 | 1/2006 | Belongia et al. | |
| 7,032,288 B2 | 4/2006 | Ladd | |
| 7,112,103 B2 | 9/2006 | Zhang et al. | |
| 7,311,526 B2 | 12/2007 | Rohrbach et al. | |
| 7,329,151 B2 | 2/2008 | Wu | |
| 7,332,990 B2 | 2/2008 | Lo et al. | |
| 7,351,066 B2 | 4/2008 | DeFonzo et al. | |
| 7,364,433 B2 | 4/2008 | Neidlein | |
| 7,419,378 B2 | 9/2008 | Ha et al. | |
| 7,445,452 B1 | 11/2008 | Wu | |
| 7,497,693 B1 | 3/2009 | Wu | |
| 7,498,546 B2 | 3/2009 | Belongia et al. | |
| 7,517,222 B2 | 4/2009 | Rohrbach et al. | |
| 7,540,773 B2 | 6/2009 | Ko | |
| 8,535,088 B2 | 9/2013 | Gao et al. | |
| 2002/0044746 A1 | 4/2002 | Kronlund et al. | |
| 2002/0054686 A1 | 5/2002 | Tabata et al. | |
| 2002/0087179 A1* | 7/2002 | Culp | A61B 17/32002 606/167 |
| 2003/0148643 A1 | 8/2003 | Yoji | |
| 2004/0077187 A1 | 4/2004 | Belongia et al. | |
| 2004/0184295 A1 | 9/2004 | Robertson et al. | |
| 2004/0209489 A1 | 10/2004 | Clapper | |
| 2004/0224539 A1 | 11/2004 | Boyd et al. | |
| 2005/0082915 A1 | 4/2005 | Steinberg | |
| 2005/0208783 A1* | 9/2005 | Suzuki | H01R 13/6205 439/42 |
| 2005/0255716 A1 | 11/2005 | Tanaka et al. | |
| 2005/0255718 A1 | 11/2005 | McLeish | |
| 2006/0051981 A1 | 3/2006 | Neidlein et al. | |
| 2006/0067690 A1 | 3/2006 | Tatum et al. | |
| 2006/0164447 A1 | 7/2006 | Poole et al. | |
| 2007/0067654 A1 | 3/2007 | Adachi | |
| 2007/0072443 A1 | 3/2007 | Rohrbach et al. | |
| 2007/0085516 A1 | 4/2007 | Fenwick et al. | |
| 2007/0112989 A1 | 5/2007 | Iwaki | |
| 2007/0184674 A1 | 8/2007 | Koch | |
| 2008/0003841 A1 | 1/2008 | Su et al. | |
| 2008/0211310 A1 | 9/2008 | Jitaru et al. | |
| 2008/0280495 A1* | 11/2008 | Ko | H01R 43/0256 439/638 |
| 2008/0305658 A1 | 12/2008 | Ko | |
| 2009/0142962 A1 | 6/2009 | Zhang | |
| 2009/0233487 A1 | 9/2009 | Zhou et al. | |
| 2010/0035441 A1* | 2/2010 | Rohrbach | H01R 13/6205 439/39 |
| 2010/0186987 A1* | 7/2010 | Aitken | H01B 9/028 174/102 R |

FOREIGN PATENT DOCUMENTS

| | | |
|---|---|---|
| CN | 201252240 Y | 6/2009 |
| CN | 101540460 A | 9/2009 |
| DE | 36 22 948 | 1/1988 |
| DE | 198 20 691 | 2/1999 |
| DE | 102 42 645 | 3/2004 |
| DE | 103 33 403 | 9/2004 |
| EP | 0 112 019 | 6/1984 |
| EP | 0 289 208 | 11/1988 |
| EP | 1 865 581 A2 | 12/2007 |
| FR | 2 448 236 A1 | 8/1980 |
| FR | 2 566 195 | 6/1984 |
| FR | 2 685 981 A1 | 7/1993 |
| GB | 2 042 826 A | 9/1980 |
| GB | 2 174 556 | 11/1986 |
| GB | 2383476 | 6/2003 |
| JP | 03-059973 | 3/1991 |
| JP | 05-335051 | 12/1993 |
| JP | 7-6817 | 1/1995 |
| JP | 11-144803 | 5/1999 |
| JP | 11-273770 | 10/1999 |
| JP | 2000-12145 | 1/2000 |
| JP | 2000-30806 | 1/2000 |
| JP | 2002056929 | 2/2002 |
| JP | 2002-367724 | 12/2002 |
| JP | 2004-206973 A | 7/2004 |
| TW | M268788 | 6/2005 |
| TW | M315891 U | 7/2007 |
| TW | M323707 U | 12/2007 |
| WO | 95/06970 | 3/1995 |
| WO | 01/09990 A1 | 2/2001 |
| WO | 01/71858 A1 | 9/2001 |
| WO | 2004/095647 | 11/2004 |

OTHER PUBLICATIONS

"Zojirushi Hot Water Dispensing Pot Review," obtained from http://www.pkshiu.com/lof/archive/2005/01/zojirushi-hot-water-dispensing--pot-review, dated Jan. 5, 2005.

CNN.com, "Break-away cord aims to make deep fryers safer," obtained from http://archives.cnn.com/2001/US/07/03/deep.fryers/, dated Jul. 4, 2001, 2-pgs.

U.S. Consumer Product Safety Commission, "Consumer Product Safety Review," Winter 2002, vol. 6, No. 3, total of 12-pgs., see p. 5.

Dowell Trading Co, Ltd., "News for Break Away Power Cords on Electric Deep Fryers," copyright 2002, 1-pg.

National Presto Industries, Inc., "Magnetic Cord for Electric Deep Fryers," obtained from http://www.gopresto.com/products/products.php?stock=09982, generated Jan. 18, 2006, 1-pg.

"Presto 9984 Control Master Heat Control with Magnetic Cord," obtained from http://www.cookingandcanning.net/pr99comaheco.html, generated Jan. 18, 2006, 1-pg.

Invitation to Pay Additional Fees mailed on Jan. 13, 2011 for PCT Patent Application No. PCT/US2010/052940, 6 pages.

International Search Report and Written Opinion of the International Searching Authority mailed on Apr. 1, 2011 for PCT Patent Application No. PCT/US2010/052940, 16 pages.

(56) References Cited

OTHER PUBLICATIONS

Chinese Notice of Grant mailed on May 10, 2011 for CN Patent Application No. 201020576366.0, with English Translation, 4 pages.
Chinese Office Action mailed on Jul. 1, 2013 for CN Patent Application No. 201010522064.X, with English Translation, 16 pages.
Chinese Office Action mailed on Sep. 18, 2012 for CN Patent Application No. 201010522064.X, English Translation, 2 pages.
Chinese Office Action mailed on Feb. 21, 2011 for CN Patent Application No. 201020576366.0, with English Translation, 2 pages.
Korean Office Action mailed on Jul. 19, 2013 for KR Patent Application No. 10-2012-7012999, with English Translation, 5 pages.
Taiwanese Office Action mailed on Jan. 8, 2013 for TW Patent Application No. 099135796, with English Translation, 14 pages.
Taiwanese Office Action mailed on May 21, 2013 for TW Patent Application No. 101145341, with English Translation, 7 pages.
Chinese Notice of Grant mailed on Dec. 2, 2013 for CN Patent Application No. 201010522064.X, 2 pages.
Tawainese Office Action mailed on Sep. 26, 2013 for TW Patent Application No. 099135796, with English Translation, 7 pages.
Taiwanese Office Action mailed on Sep. 26, 2013 for TW Patent Application No. 101145341, with English Translation, 11 pages.
Korean Office Action mailed on Feb. 26, 2014 for KR Patent Application No. 10-2012-7012999, with English Translation, 5 pages.
European Examination Report mailed on Apr. 17, 2014 for EP Patent Application No. 10770927.1, 5 pages.
Chinese Office Action mailed on Aug. 19, 2015 for CN Patent Application No. 201410053851.2, with English translation, 20 pages.

* cited by examiner

MAGNETIC CONNECTOR HAVING A UNITARY HOUSING

CROSS-REFERENCE TO RELATED APPLICATION

This application is a continuation of U.S. patent application Ser. No. 12/582,308, filed Oct. 20, 2009, now U.S. Pat. No. 8,535,088, entitled "MAGNETIC CONNECTOR HAVING A UNITARY HOUSING", which is incorporated by reference.

BACKGROUND

Portable electronic devices have become increasingly popular the past several years. Laptop and netbook computers, cell phones, portable media devices, and the like have become ubiquitous, and soon notebook and tablet computing devices will follow.

These devices include batteries that provide power. Unfortunately, these batteries need recharging. This recharging is often performed using a power cable having a connector insert or cable plug that mates with a connector receptacle on the portable device. Power can be supplied by a power transformer that receives power from a wall outlet, vehicle charging outlet, or other source. The power transformer converts the power from the outlet to a power level that can be used to charge the battery in a portable device. In some circumstances, these power cables may also convey signals between the portable device and a second electronic device.

The connector insert or cable plug may include circuitry inside of a plug housing. The plug housing typically is formed using several pieces that fit together around the circuitry. This patchwork of pieces used to form a plug housing can result in a housing having a less than optimal appearance.

The cable can include a conductor surrounded by an insulating layer. This conductor can be used to convey a power supply, such as a positive power supply voltage. The insulating layer can be further surrounded by a metallic braid layer that is used to convey ground. The braiding may be covered with a polyvinyl chloride coating. This coating provides a fire resistance to protect the electronic device in the event that the power transformer overheats or catches on fire. However, for various reasons, it is environmentally undesirable to use materials such as polyvinyl chloride. Unfortunately, halogen-free cables do not provide adequate fire resistance.

Thus, what is needed are improved power cables that have plug housings that provide an improved appearance as well as employ a halogen-free cable while providing adequate fire resistance.

SUMMARY

Accordingly, embodiments of the present invention provide power cables that include cable plug housings having an improved appearance as well as employing a halogen-free cable while providing adequate fire resistance.

A specific embodiment of the present invention provides a power cable having a cable plug or connector insert with a unitary (made from a single piece) or substantially unitary body. This body provides an improved appearance, greater strength and durability, and is simple to manufacture at a reduced cost. The cable plug can receive a power cable and may provide contacts for power transmission. The housing may be substantially unitary, that is, it may be made predominantly using a single piece of material. The single piece of material may be formed using metal, such as aluminum. The single piece of material may alternately be formed using plastic, ceramic, or other material. The single piece may be approximately cylindrical, or it may have other shapes, such as oval, square, or other shapes or combinations of shapes.

The contacts or terminals may extend from the cable plug housing and may be protected by a protrusion that mates with a connector receptacle on an electronic device. In various embodiments of the present invention, the protrusion is a magnetic element that is attracted to a second magnetic element in the connector receptacle. These magnetic elements may be magnets, attraction plates, or other types of magnetic elements, such as electromagnets. The attraction plates may be formed using a ferromagnetic material. In a specific embodiment of the present invention, the connector insert protrusion can include an attraction plate that is attracted to a magnetic element located in the connector receptacle.

Another specific embodiment of the present invention provides a power cable that is formed using halogen-free materials. To provide adequate fire protection, a strain relief formed using multiple materials is used. This strain relief can provide an interface between the cable and a housing, for example, a housing enclosing a power transformer. The strain relief can include a first, interior portion formed using a rigid, fire-resistant material. The fire-resistant material may be a polycarbonate, polycarbonate ABS (PC/ABS) blend, or other appropriate material. The strain relief may include a second, exterior portion formed using a flexible material. This material may be a thermoplastic elastomer (TPE), fluorinated ethylene propylene (FEP), or other appropriate material.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Figure 1:
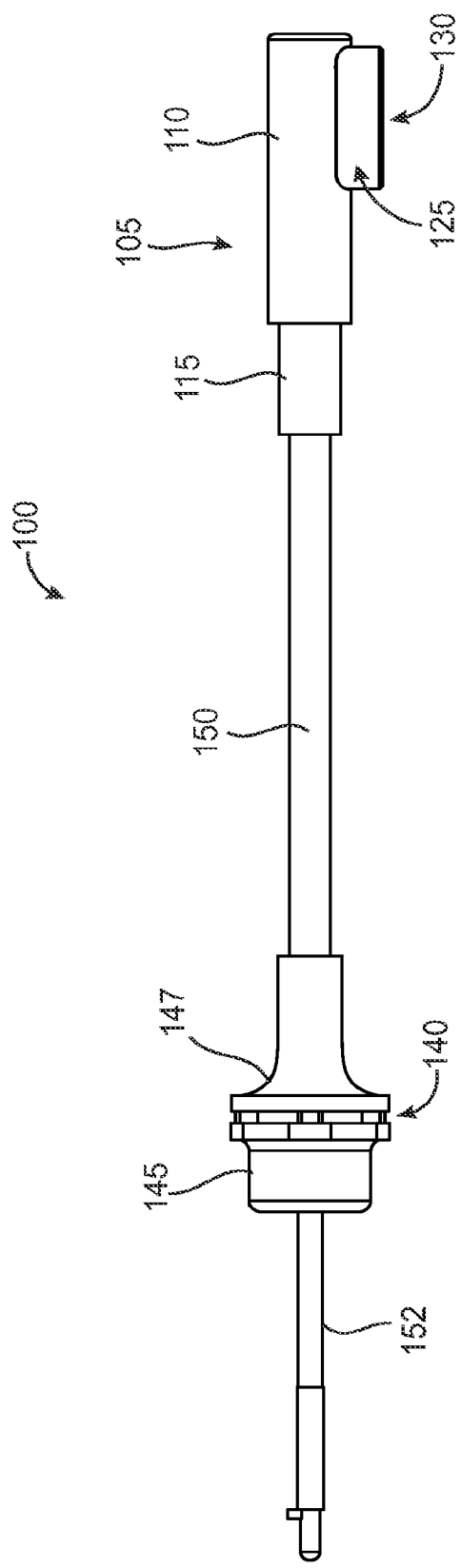
FIG. 1 illustrates a power cable assembly according to an embodiment of the present invention.

FIG. 1 illustrates a power cable assembly 100 according to an embodiment of the present invention. This figure, as with the other included figures, is shown for illustrative purposes and does not limit either the possible embodiments of the present invention or the claims.

Power cable assembly 100 may be used for providing power to an electronic device, such as a laptop, netbook, notebook, tablet computer, media player, portable media player, cell phone, or other type of electronic device. Cable assembly 100 may also be used to convey signals between such devices. Cable assembly 100 may include cable plug 105 and strain relief 140 connected together via cable 150.

Cable plug 105 may mate with a compatible connector receptacle (not shown.) Cable plug 105 may include housing 110, attraction plate 125, and strain relief 115. Housing 110 may be unitary or substantially unitary. This unitary construction can provide a connector plug 105 having an improved appearance, increased strength, and reduced manufacturing costs. Housing 110 may be formed using metal, such as aluminum, plastic, ceramic, or other material.

Attraction plate 125 may be formed around contacts 130. Attraction plate 125 may have two axes of symmetry, allowing cable plug 105 to mate with a compatible connector receptacle in at least two orientations. Attraction plate 125 may be formed of metal, plastic, ceramic, or other material. For example, the attraction plate may be made using a ferromagnetic material.

A dust cover (not shown) may cover the sides of attraction plate 125 and the contacts 130. The dust cover may be formed using metal, plastic, ceramic, or other material. For example, it may be formed of a transparent plastic. The dust cover may form a seal, reducing or eliminating the amount of dust particles entering housing 110 when cable assembly 100 is transported. To prevent the loss of the dust cover, the dust cover may be attached to the cable assembly 100 by a tie, cord, wire, or other fastener.

Contacts 130, which may also be referred to as signal terminals or pins, may include contacts for signal and power supplies, such as power and ground. Cable plug 105 can include five such contacts, though in other embodiments of the present invention, other numbers of contacts may be included. For example, three contacts may be included. Also in other embodiments of the present invention, one or more contact for fiber-optic cables may be included. The center pin may be a detect pin that detects that cable plug 105 has mated with a compatible connecter receptacle. Two ground pins may be located on each side of the detect pin. Two power supply pins may be located on each side of the detect pin between the detect pin and the ground pins. Alternately, the ground pins may be located between the power supply pins and the detect pin. The contacts may be retractable, that is, they may be biased, for example by a spring.

Cable plug 105 can include a strain relief 115. Strain relief 115 may be formed of a flexible material. For example, it may be made of a halogen-free material. In a specific embodiment of the present invention, it can be formed using a thermoplastic elastomer, fluorinated ethylene propylene, or other appropriate material.

Strain relief 140 and cabling 152 can form a pigtail that may be used to connect power cable assembly 100 to a power supply. For example, the pigtail may be housed in an enclosure that includes a power transformer or other circuitry. For example, the enclosure may have power prongs or other connections to receive power from a wall socket, vehicle outlet, or other power supply. Circuitry internal to the housing can convert the received power supply to a power level appropriate for the electronic device to be charged. Cabling 152 may connect to this power conversion circuitry, such as a power transformer that converts AC power to DC power. Alternately, cabling 152 may connect to power conversion circuitry that converts a first DC power supply to a second DC power supply. The housing may also include wired or wireless data communications and other electronic circuits. Cabling 152 may include further connections for these circuits.

Strain relief 140 can include an interior portion 145 and exterior portion 147. Interior portion 145 may be inside the housing (not shown) that also includes the power transformers or other electrical components. Exterior portion 147 may be located outside of this housing. Inside portion 145 may be formed using a hard plastic, such as a polycarbonate, polycarbonate ABS blend or other appropriate material, for fire protection. Exterior portion 147 may be formed using a more flexible material, such as a thermoplastic elastomer, fluorinated ethylene propylene, or other appropriate material.

Strain relief 140 may provide an interface between cable 150 and the housing. Strain relief 140 can allow cable 150 to be flexed or moved relative to the housing, such that cable 150 does not wear excessively. Strain relief 115 can similarly protect cable 150 at its interface with cable plug 105.

Cable 150 may be formed with an inside conductor surrounded by a metallic braiding. The inside conductor may be used to convey power, while the braiding may be used to convey ground. Isolation layers may be included between the inside conductor and the braiding, and outside of the cable around the braiding. Cable 150 may be made of a halogen-free material. For example, it may be formed using a thermoplastic elastomer, fluorinated ethylene propylene, or other appropriate material. Cable 150 may include additional conductors for conveying signals, for example, those provided by wired or wireless data communications and other electronic circuits located in the housing that includes the power transformer or conversion circuitry. Cable 150 may also include one or more fiber-optic cables.

Again, it is desirable to provide a cable plug 105 having an attractive appearance, and that is durable and easy to manufacture. Accordingly, embodiments of the present invention provide a cable plug 105 having a unitary or substantially unitary housing. An example is shown in the following figure.

Figure 2:
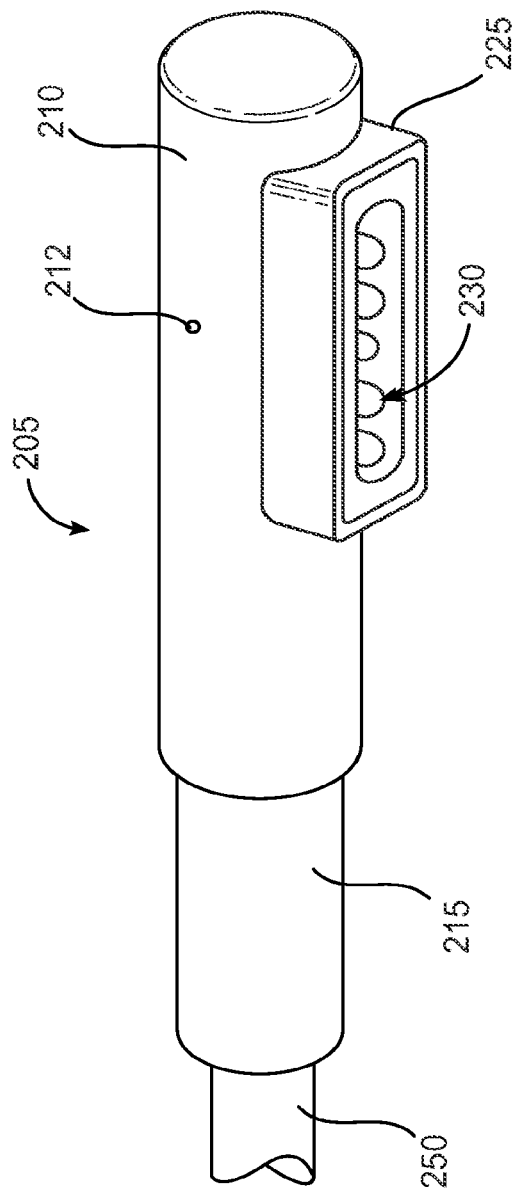
FIG. 2 illustrates a cable plug according to an embodiment of the present invention.

FIG. 2 illustrates a cable plug 205 according to an embodiment of the present invention. Cable plug 205 may also be referred to as a connector insert. Cable plug 205 can include housing 210, attraction plate 225, contacts 230, and strain relief 215. Cable 250 can attach to cable plug 205. Attraction plate 225 can protect contacts 230 and can be magnetically attracted to magnets located in a compatible connector receptacle. A dust cover (not shown) may be employed to prevent particulate matter from entering housing 210 when the cable assembly is transported. Housing 210 may also include a light-emitting diode (LED) exit 212. Exit 212 may allow light from an LED inside housing 210 to escape. In a specific embodiment of the present invention, a lit LED may indicate that an electrical connection has been made between cable plug 205 and a compatible receptacle (not shown.)

Housing 210 may be unitary, though in other embodiments of the present invention it may be substantially unitary. In this example, housing 210 is cylindrical, though in other embodiments of the present invention housing 210 may have other shapes. Housing 210 may provide an attractive appearance, and may be durable and easy to manufacture. Housing 210 may be metallic, plastic, ceramic, or formed using another material. In a specific embodiment of the present invention, housing 210 is made of aluminum.

Attraction plate 225 may have two axes of symmetry, allowing cable plug 205 to mate with a compatible connector receptacle in at least two orientations. The attraction plate may be metallic, such that it is attracted to magnets inside the connector receptacle. These magnets may have opposing polarities, such that magnetic field lines that originate in one magnet travel through attraction plate 225 and terminate in a second magnet. Attraction plate 225 can, for example, be formed using a ferromagnetic material. In other embodiments of the present invention, attraction plate 225 may be formed using one or more magnets, such as rare-earth magnets or electromagnets.

A dust cover (not shown), may be arranged to cover attraction plate 225 and contacts 230. The dust cover may be formed using metal, plastic, ceramic, or other material. For example, the dust cover may be made of a transparent plastic. This transparent plastic may be colored to provide a pleasing appearance.

Contacts 230 may be pogo pins or other types of contacts. Contacts 230 may include a center contact. The center contact may be a detect pin. Alternately, it may be a fiber-optic connection, signal pin, or other type of contact, signal terminal, or pin. The two contacts 230 on each side of the center pin may convey a positive power supply, though they may alternately convey ground. The two outside contacts 230 may convey ground, though they may alternately convey a positive power supply. Contacts 230 are typically metallic, such that they are conductive. Contacts 230 may be formed using brass, copper, or other metals.

Strain relief 215 can protect cable 250 from excessive wear that could otherwise result at the interface with housing 210 when cable 250 is moved or flexed relative to housing 210. Strain relief 215 may be formed using a flexible material, such as a thermoplastic elastomer, fluorinated ethylene propylene, or other appropriate material.

Again, it is desirable that cable plug 205 be robust and simple to manufacture. An example of the components that may be used to construct cable plug 205 according to an embodiment of the present invention is shown in the following figure.

Figure 3:
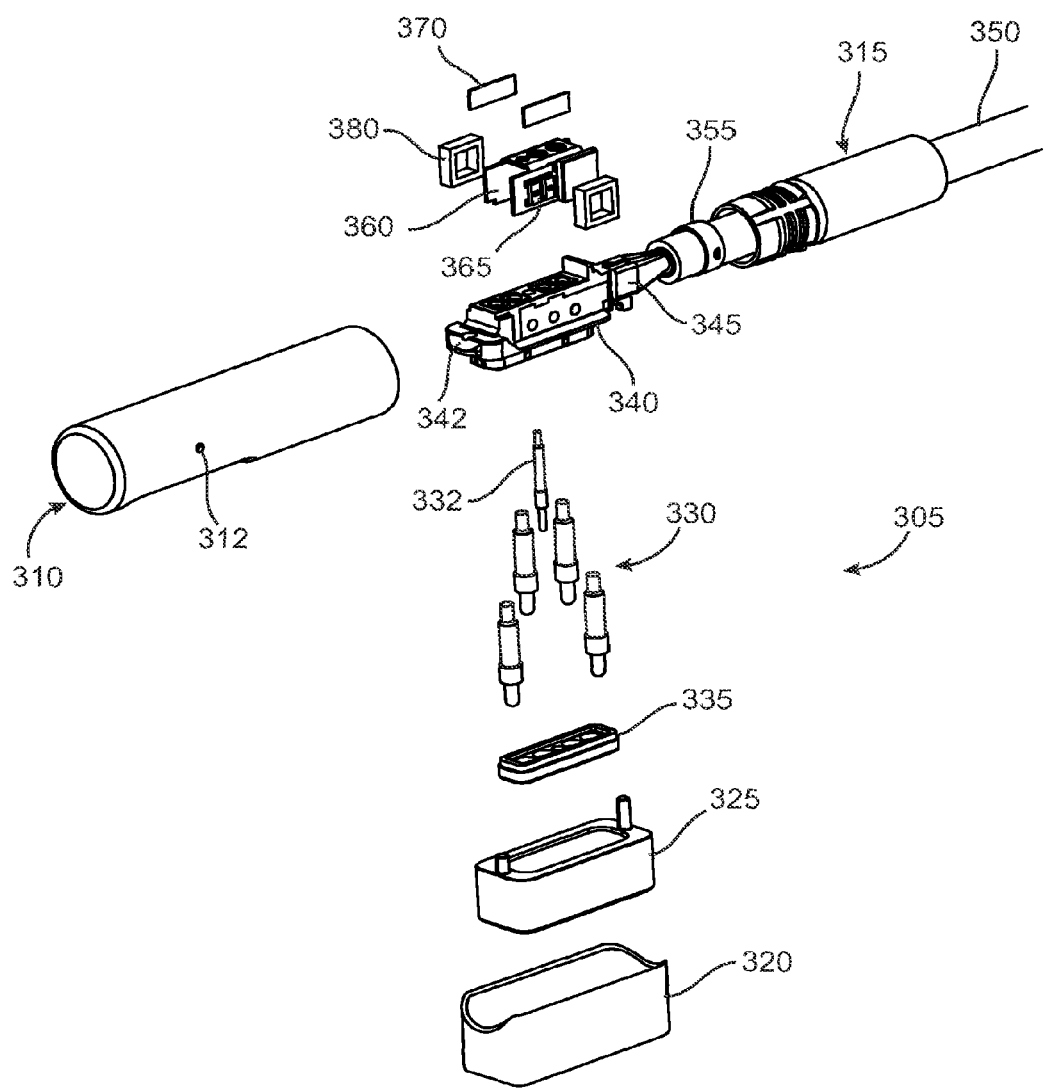
FIG. 3 illustrates components that may be used to construct a cable plug according to an embodiment of the present invention.

FIG. 3 illustrates components that may be used to construct a cable plug 305 according to an embodiment of the present invention. Cable plug 305 may include housing 310, strain relief 315, cable 350, crimping ring 355, assembly 340, contacts 330 and 332, front plate 335, attraction plate 325, dust cover 320, circuit board 360, LEDs 365, light pipes 370, and light insulators 380.

Housing 310 may include an LED exit 312. LED exit 312 may be an actual hole, or it may be a number of small perforations. In a specific embodiment of the present invention, these perforations may be on the order of 0.03 mm in size. At this size, the individual perforations may not be not visible unless light is emitting through them. Again, housing 310 may be metal, for example aluminum, plastic, ceramic, or it may be made of another material.

Strain relief 315 may receive cable 350. Strain relief 315 can be flexible and may prevent housing 310 from wearing cable 350 as cable 350 moves relative to housing 310 during use. Strain relief 315 may be made of a flexible material, such as a thermoplastic elastomer, fluorinated ethylene propylene, or other flexible material.

Cable 350 passes through strain relief 315. Cable 350 may include a center conductor for providing a positive power supply. Cable 350 may include other conductors, fiber-optic cables, or other signal or power conduits. The center conductor may be insulated and surrounded by a metallic braiding. The metallic braiding may be used to covey ground. The metallic braiding may be further insulated. Various embodiments of the present invention use a halogen-free coating or jacket, such as a coating formed using a thermoplastic elastomer, or other appropriate material.

Crimping ring 355 can crimp cable 350. Crimping ring 355 may be metallic, plastic, or formed using other materials. Crimping ring 355 may prevent cable 350 from splitting due to stresses that may result with usage. Crimping ring 355 may also provide strain relief. In various embodiments of the present invention, crimping ring 355 may connect mechanically and (or) electrically to any or all of the metal braiding of cable 350, assembly 340, contacts 345, or circuit board 360.

Assembly 340 may attach to cable 350 at contacts 345. For example, the inside conductor and braiding of cable 350 may attach to assembly 340 at contacts 345. Contacts 345 may be located on each side of a portion of assembly 340. Assembly 340 may be formed using an insulating material, such that an insulative housing is formed. Contacts 345 may connect to conductive leads internal to assembly 340, where the conductive leads carry power and ground. Assembly 340 may be substantially made of plastic that is formed around these conductive leads. Assembly 340 may further include a metallic tab 342, which may be coupled to, or an extension of, one of these conductive leads, for example, the conductive lead carrying ground. Metallic tab 342 may be in contact or close proximity to housing 310. When housing 310 is metallic, this contact or close proximity can provide an electrical discharge path from housing 310 to ground. This can protect cable plug 305 from electrostatic discharge (ESD), for example, when housing 310 is touched by a user.

Contacts 330 and 332 may fit in passages in assembly 340. Contacts 330 may provide power and ground terminals. For example, inside contacts 330 may provide a positive power supply while outside contacts 330 may provide ground. The passages may be formed at least partly by the conductive leads carrying power and ground, such that power and ground connections to the pins are formed when contacts 330 are inserted into passages in assembly 340. Contacts 330 may be pogo pins or other types of pins. For example, they may be metallic pins inside of a conductive housing. A spring or other biasing mechanism may be located inside the housing, such that the pins remain in an extended state until cable plug 305 is mated with a compatible connector receptacle. When such mating takes place, the pins may be pushed back or retracted into housing 310. Contact 332 may be a straight pin that is pushed into a detector circuit when cable plug 305 is mated with a compatible connector receptacle, though in other embodiments of the present invention, contact 332 may also be a pogo pin or other spring-biased contact.

Front plate 335 may be used to provide an attractive appearance when the contact portion of cable plug 305 is viewed. Front plate 335 may be plastic or other material and may be formed having a desirable color. For example, the color may match a color of cable 350, housing 310, or other component.

Attraction plate 325 can be magnetically attracted to magnets in a compatible connector receptacle. For example, magnetic field lines may originate in a first magnet in the compatible connector receptacle, pass through attraction plate 325, and terminate in a second magnet in the compatible connector receptacle. Attraction plate 325 can be formed using a ferromagnetic metal or other material. In other embodiments of the present invention, attraction plate 325 may be formed using one or more magnets.

Dust cover 320 may cover attraction plate 325 during transport of the cable assembly or during other times when cable plug 305 is not inserted in a compatible connector receptacle, providing an improved appearance to cable plug 305. Dust cover 320 may be metal, plastic, ceramic, or other material. For example, dust cover 320 may be formed of a transparent plastic. Dust cover 320 may also reduce or prevent dust or other particulate matter from entering housing 310 through gaps between housing 310 and attraction plate 325. To help users avoid losing dust cover 320, dust cover 320 may be attached to the cable assembly using a cord, tie, wire, or other fixture.

Circuit board 360 may fit around assembly 340. Circuit board 360 may be a printed circuit board, flexible circuit board, or other appropriate circuit board. Circuit board 360 may include detection circuitry that may be triggered by contact detect pin 332. Contacts 330 and 332 may be soldered to circuit board 360. Circuit board 360 may be glued or otherwise fixed to assembly 340.

LEDs 365 may be located on circuit board 360. LEDs 365 may light when contact detect pin 332 is pushed, thereby indicating that cable plug 305 has been mated with a compatible connector receptacle.

Light pipes 370 may guide light from LEDs 365. Light pipes 370 may be made of a transparent material. Light pipes may be colored to give interesting or informative coloring to light emitted by LEDs 365. Light pipes 370 may be fixed to the inside of housing 310.

Light insulators 380 may be used to prevent stray light from illuminating exits 312. For example, light between plug portion 320 and housing 310 may otherwise illuminate exit 312, thereby falsely indicating an electrical connection between cable plug 305 and a compatible connector receptacle. Light insulators 380 may be formed using foam or other opaque material. Light insulators 380 may be fixed to light pipes 370, housing 310, circuit board 360, LEDs 365, or other appropriate location.

In a specific embodiment of the present invention, during assembly, cable 350 may be inserted through housing 310 such that cable 350 emerges from the opening in housing 310 used by contacts 330. Strain relief 315 and crimping ring 355 may be applied to cable 350. A center conductor and metallic braiding of cable 350 may be soldered to contacts 345. Contacts 330 and 332 may be fit in passages in assembly 340. Circuit board 350, including LEDs 365, may be soldered to contacts 330 and 332 and affixed to assembly 340. Front plate 335 and attraction plate 325 may be attached. This assembly may then fit through the opening in housing 310 as cable 350 is pulled away from housing 310. The extent to which cable 350 is pulled may be determined by a manufacturing fixture. To facilitate the passage of strain relief 315 through housing 310, glue may be used. This glue may provide lubrication as strain relief 315 passes through housing 310. The glue may further act as an adhesive when dry to fix strain relief 315 and cable 350 in place relative to housing 310. Dust cover 320 may be placed over attraction plate 325 and contacts 330 and 332.

In another embodiment of the present invention, one or more of front plate 335 and attraction plate 325 are attached after assembly 340 and its connected components are fit through the opening in housing 310. Cable 350 may be inserted through housing 310 such that cable 350 emerges from the opening in housing 310 used by contacts 330. Strain relief 315 and crimping ring 355 may be applied to cable 350. A center conductor and metallic braiding of cable 350 may be soldered to contacts 345. Contacts 330 and 332 may be fit in assembly 340. Circuit board 350, including LEDs 365, may be soldered to contacts 330 and 332 and affixed to assembly 340. Front plate 335 may be attached at this point, or it may be attached later with attraction plate 325. Alternately, front plate 335 and attraction plate 325 may be attached at this point, or they may be attached later. This assembly may then fit through the opening in housing 310 as cable 350 is pulled away from housing 310. The extent to which cable 350 is pulled may be determined by a manufacturing fixture. To facilitate the passage of strain relief 315 through housing 310, glue may be used. This glue may provide lubrication as strain relief 315 passes through housing 310. The glue may further act as an adhesive when dry to fix strain relief 315 and cable 350 in place relative to housing 310. Attraction plate 325 and front plate 335 may be attached at this time, as needed. Dust cover 320 may be placed over attraction plate 325 and contacts 330 and 332.

In another embodiment of the present invention, during assembly, the cable and connected components are fit into the end of housing 310. Strain relief 315 and crimping ring 355 may be applied to cable 350. A center conductor and metallic braiding of cable 350 may be soldered to contacts 345. Contacts 330 and 332 may be fit in assembly 340. Circuit board 350, including LEDs 365, may be soldered to contacts 330 and 332 and affixed to assembly 340. Contacts 330 and 332 may be retracted, and assembly 340 and its connected components fit into the end of housing 310. Front plate 335 and attraction plate 325 may be attached before or after insertion. Again, glue may be used as a lubricant when strain relief 315 is inserted into housing 310. Dust cover 320 may be placed over attraction plate 325 and contacts 330 and 332.

Again, during assembly, light pipes 370 may be fixed to housing 310. Light insulators 380 may be included to reduce the amount of stray light emitted from exits 312. An example of this structure is shown in the following figure.

Figure 4:
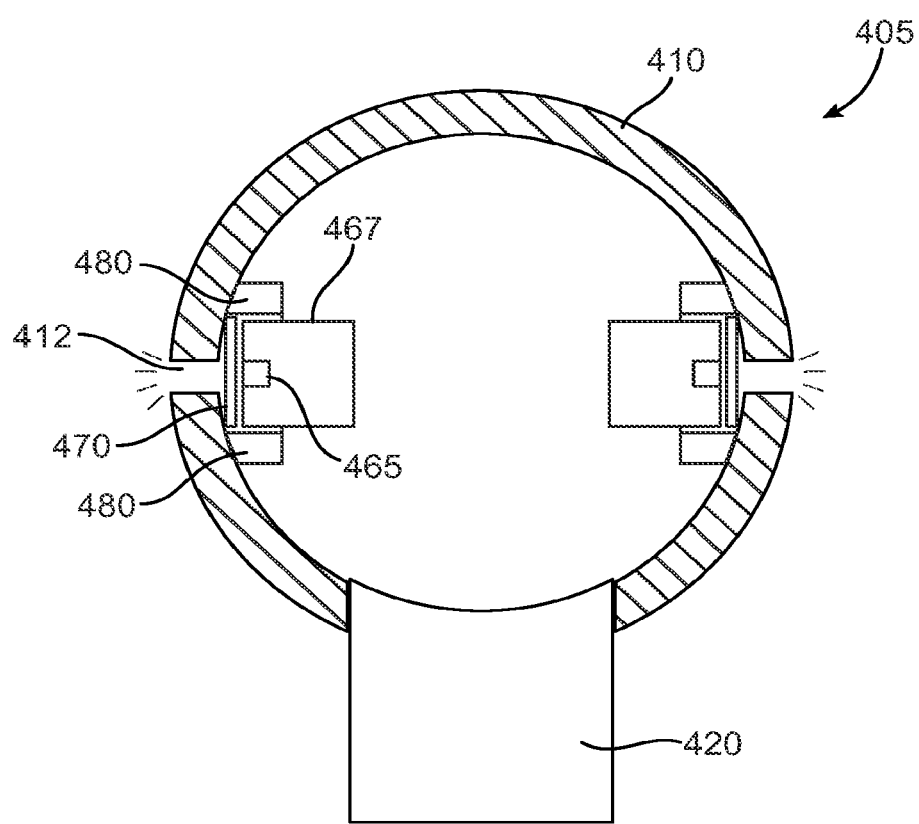
FIG. 4 illustrates a side view of a portion of a cable plug according to an embodiment of the present invention.

FIG. 4 illustrates a side view of a portion of a cable plug 405 according to an embodiment of the present invention. Cable plug 405 may include housing 410 having openings or exits 412. Light from LEDs 465 may be emitted through exits 412 when cable plug 405 is mated with a compatible connector receptacle (not shown.) Specifically, light from LED 465 may be guided by LED housing 467 towards light pipe 470. Light pipe 470 may guide the light through opening or exit 412. Light insulators 480 can prevent stray light inside the connector housing 410 from being emitted through exit 412. For example, light may seep between housing 410 and attraction plate 420, thereby appearing to falsely indicate that a connection has been made between cable plug 405 and a compatible connector receptacle.

It may be desirable to place a second light pipe in exit 412. If this is done, it is further desirable that the second light pipe be flush with the surface of housing 410, such that any ridges or bumps between the second light pipe and housing 410 are reduced or eliminated.

Accordingly, in a specific embodiment of the present invention, an adhesive is used to form a second light pipe in exit 412 of housing 410. The adhesive may be placed in exit 412. This adhesive may be light curing. Light may be applied to the inside of housing 410 to cure the adhesive. An air flow may be similarly applied to the inside of housing 410, thereby pushing the adhesive out exit 412 as it is cured. Excess adhesive can then be wiped from the outside of housing 410, such that the surface of the adhesive is flush with the outside of housing 410. Light pipes 470 may be attached to these second light pipes formed by the adhesive.

Again, it is desirable to use halogen-free materials in manufacturing the cabling used in these power cable assemblies. Halogen is commonly used since it provides a flexible cable that is fire-resistant. Unfortunately, materials that are used for halogen-free cabling are themselves not fire retardant. Further, the addition of fire-retardant chemicals makes halogen-free cables brittle and is therefore not suitable. Accordingly, various embodiments of the present invention provide a strain relief that provides fire protection and is halogen-free. An example is shown in the following figure.

Figure 5:
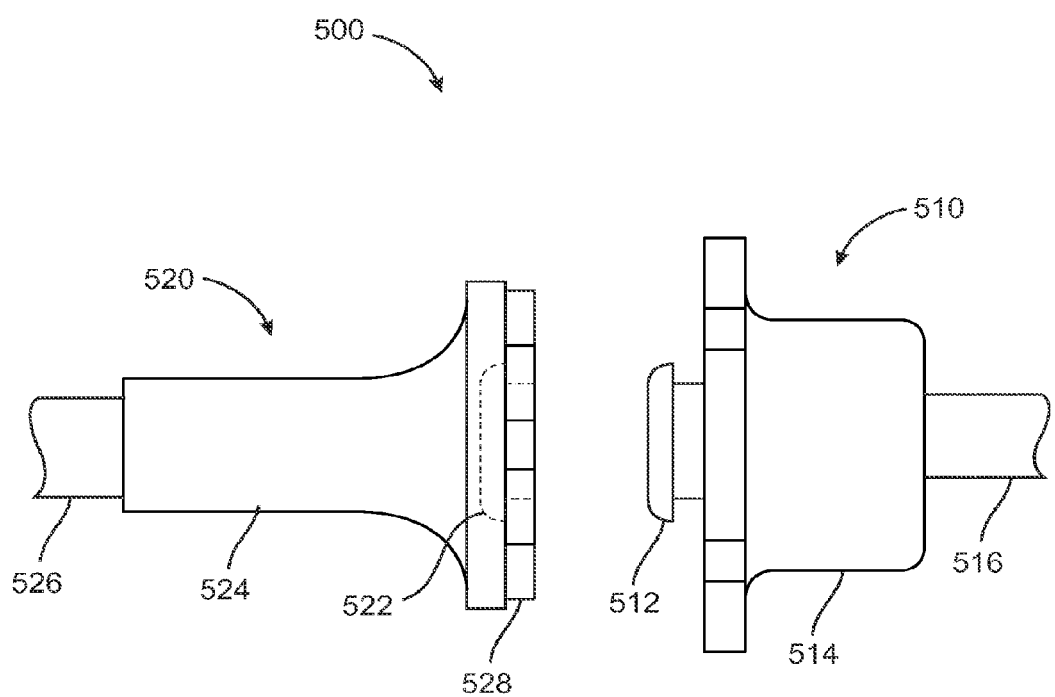
FIG. 5 illustrates portions of a strain relief according to an embodiment of the present invention.

FIG. 5 illustrates portions of a strain relief 500 according to an embodiment of the present invention. Strain relief 500 includes interior portion 510 and exterior portion 520. Cabling 516 passes through interior portion 510. Interior portion 510 can be formed or molded of a single piece of material. This material may be a hard plastic, such as a polycarbonate, polycarbonate ABS blend, or other appropriate material. This may provide fire protection, protecting an electronic device that is being charged.

Outer portion 520 of strain relief 500 may be formed in an additional molding step. This type of molding may be referred to as a double-shot process. Cable 526 passes through exterior portion 520. Exterior portion 520 may be formed around a projection or key 512 of interior portion 510, to provide a secure fit between interior portion 510 and exterior portion 520. Key 512 may have protrusions such that exterior portion 520 does not rotate relative to interior portion 510. Exterior portion 520 may be made of a flexible material, such as a thermoplastic elastomer, fluorinated ethylene propylene, or other appropriate material. Exterior portion 520 may provide the flexibility needed to protect cable 526 from excessive wear at its interface with strain relief 500 and the housing.

Interior portion 520 may be located in a housing. This housing may enclose a power transformer or converter, wired or wireless data or communication circuitry, or other types of electronics circuitry. The color of exterior portion 520 may be made to match a color of the housing or cable.

In other embodiments of the present invention, strain relief 500 may be formed using a three step process. In these embodiments, the additional step is a first molding step where cables 526 and 516 are covered. The following two steps provide the remainder of interior portion 510 and exterior portion 520. In various embodiments of the present invention, cables 526 and 516 may be one cable or they may be multiple cables.

Figure 6:
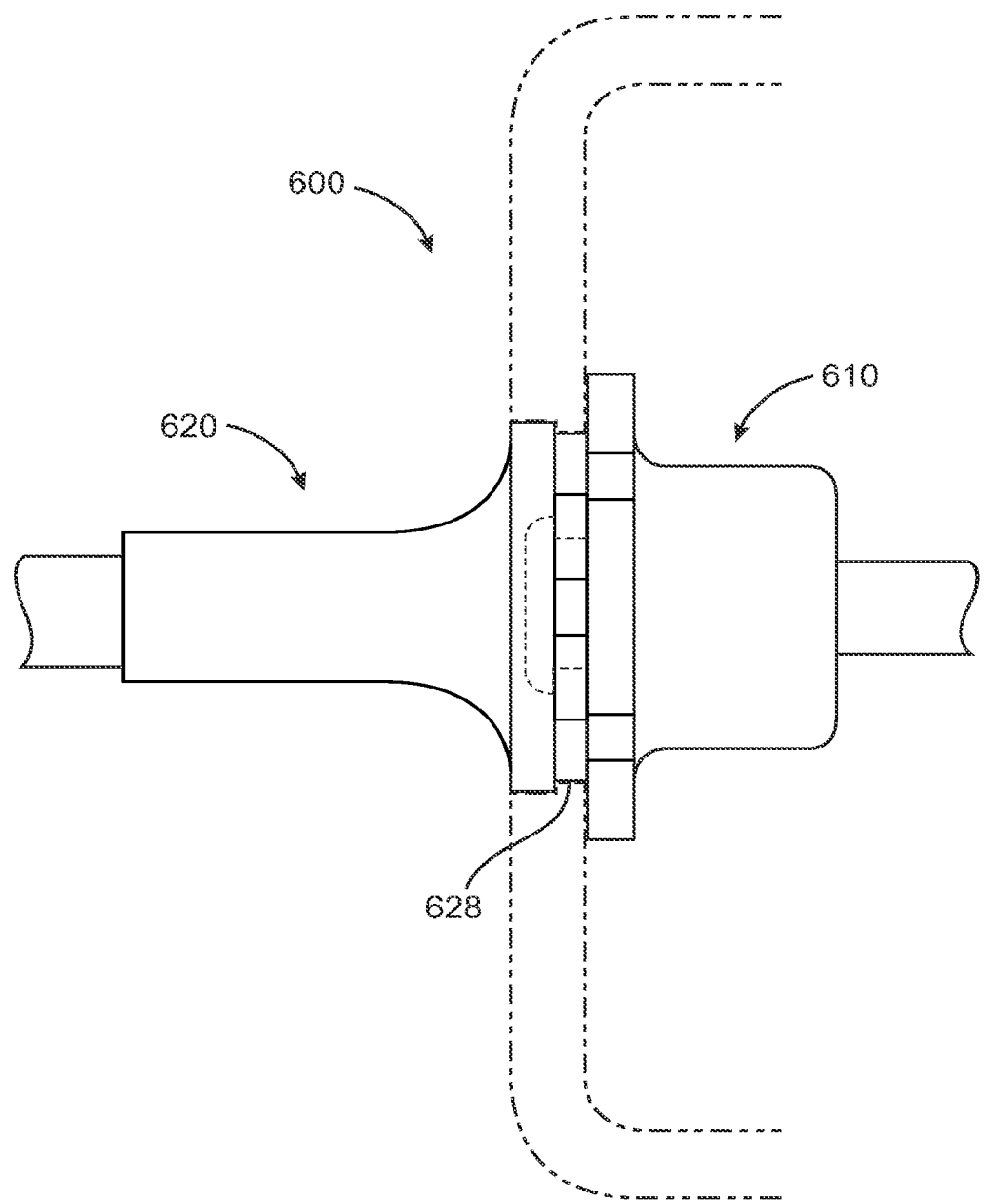
FIG. 6 illustrates a strain relief according to an embodiment of the present invention.

FIG. 6 illustrates a strain relief 600 according to an embodiment of the present invention. Strain relief 600 includes interior portion 610 and exterior portion 620. Interior portion 610 may provide fire protection, while exterior portion 620 may provide a flexible strain relief A side of a housing, shown here by dashed lines, may fit in the gap or slot 628. Again, the housing may house transformers, data communications circuitry, and other types of electronic circuitry.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A power cable assembly comprising:
   a cable plug comprising a cylindrical housing having a first circular end and a second circular end, and a first opening at the first end and a second opening on a side of the cylindrical housing, the second opening spaced away from the first end and the second end; and
   a cable including a power conductor and a ground conductor and entering the cable plug at the first opening at the first end of the cylindrical housing, the cable plug further comprising
   a plurality of contacts each having a portion beyond the second opening in the side of the cylindrical housing such that contact may be made with opposing contacts in a compatible connector receptacle;
   a light-emitting diode; and
   a magnetic element located at least between the plurality of contacts and the second end of the cylindrical housing.

2. The power cable assembly of claim 1 wherein the cylindrical housing is formed using plastic.

3. The power cable assembly of claim 1 wherein the cylindrical housing is substantially unitary.

4. The power cable assembly of claim 1 wherein the magnetic element comprises an attraction plate.

5. The power cable assembly of claim 1 wherein each of the plurality of contacts pass through the second opening in the side of the cylindrical housing and extend beyond the cylindrical housing.

6. The power cable assembly of claim 4 wherein when the cable plug is inserted in a compatible connector receptacle the magnetic element in the cable plug is magnetically attracted to a magnet in the connector receptacle.

7. The power cable assembly of claim 1 wherein the magnetic element comprises a magnet.

8. The power cable assembly of claim 7 wherein when the cable plug is inserted in a compatible connector receptacle the magnetic element in the cable plug is magnetically attracted to a magnet in the connector receptacle.

9. The power cable assembly of claim 8 wherein the cylindrical housing is formed using plastic.

10. A cable plug comprising:
    a cable having a power conductor and a ground conductor;
    an assembly comprising a nonconductive insulative housing and power and ground conductors, the power and ground conductors of the assembly terminating in a first and second contact, the first contact coupled to the power conductor of the cable and the second contact coupled to the ground conductor of the cable;
    a plurality of contacts including the first contact and the second contact and located in passages in the assembly and each having a contact portion such that contact may be made with opposing contacts in a compatible connector receptacle;
    a light emitting diode;
    a magnet between the plurality of contacts and an end of the cable plug; and
    a cylindrical housing enclosing at least a portion of the assembly and light emitting diode, the cylindrical housing having a circular first end and a circular second end.

11. The cable plug of claim 10 wherein the cylindrical housing is unitary.

12. The cable plug of claim 10 wherein the cylindrical housing includes a first opening at a first end, where the cable enters the cable plug at the first opening.

13. The cable plug of claim 10 wherein the contacts are fixed contacts.

14. The cable plug of claim 10 wherein the contacts comprise a center contact, two ground contacts, and two power supply contacts.

15. The cable plug of claim 14 wherein the power supply contacts are on each side of the center contact, and the ground contacts are on each side of the power supply pins away from the center contact.

16. A cable plug comprising:
    an insulative housing having a first circular end and a second circular end;
    a printed circuit board;
    a cable including a power conductor and a ground conductor, the power conductor and ground conductor coupled to the printed circuit board;
    a plurality of contact pins having a contact portion extending beyond the housing such that contact may be made with opposing contacts in a compatible connector receptacle, the contact pins having tail portions soldered to the printed circuit board;

a light-emitting diode fixed to the printed circuit board; and an attraction plate attached to the housing, the attraction plate spaced away from the first circular end and the second circular end and having an opening for a contact portion of at least one of the plurality of contact pins, wherein the insulative housing is a substantially cylindrical housing having a first opening for the cable and a second opening for at least one of the plurality of contact pins, the attraction plate and cylindrical housing substantially enclosing the plurality of contacts, the printed circuit board, and the light-emitting diode.

17. The cable plug of claim 16 wherein the insulative housing includes a third opening for light emitted by the light-emitting diode.

18. The cable plug of claim 16 wherein the cable plug further comprises a metal tab formed from an end of the ground conductor.

19. The cable plug of claim 16 wherein the contact pins comprise spring-biased pins.

20. The cable plug of claim 16 wherein the contact pins comprise a center pin, two ground contact pins, and two power supply contact pins.

21. The cable plug of claim 20 wherein the power supply contact pins are on each side of the center pin, and the ground contact pins are on each side of the power supply pins away from the center pin.

* * * * *